(12) United States Patent
Canedo Pardo et al.

(10) Patent No.: US 9,890,763 B2
(45) Date of Patent: Feb. 13, 2018

(54) COUNTERWEIGHTING A WIND TURBINE HUB

(71) Applicant: ALSTOM RENEWABLE TECHNOLOGIES, Grenoble (FR)

(72) Inventors: Santiago Canedo Pardo, Barcelona (ES); Javier Bescos, Barcelona (ES)

(73) Assignee: ALSTOM Renewable Technologies, Grenoble (FR)

( * ) Notice: Subject to any disclaimer, the term of this patent is extended or adjusted under 35 U.S.C. 154(b) by 360 days.

(21) Appl. No.: 14/666,232

(22) Filed: Mar. 23, 2015

(65) Prior Publication Data

US 2015/0275853 A1    Oct. 1, 2015

(30) Foreign Application Priority Data

Mar. 28, 2014  (EP) .................................... 14382116

(51) Int. Cl.
*F03D 1/00*       (2006.01)
*F03D 80/00*      (2016.01)
(Continued)

(52) U.S. Cl.
CPC ............. *F03D 1/001* (2013.01); *F03D 13/10* (2016.05); *F03D 80/00* (2016.05); *F03D 80/88* (2016.05);
(Continued)

(58) Field of Classification Search
CPC .......... F03D 1/00; F03D 1/001; F03D 1/0658; F03D 13/10; F03D 13/20; F03D 13/22;
(Continued)

(56) References Cited

U.S. PATENT DOCUMENTS 7,165,941 B2 * 1/2007 Wobben ................ F03D 1/0658
416/144
2004/0253109 A1   12/2004 Wobben
(Continued)

FOREIGN PATENT DOCUMENTS

DE    10 2009011603    9/2010
EP        2 650 537    10/2013

OTHER PUBLICATIONS

European Search Report for EP 14382116, dated Sep. 4, 2014, 6 pgs.

*Primary Examiner* — Sarang Afzali
(74) *Attorney, Agent, or Firm* — Dority & Manning, P.A.

(57) ABSTRACT

Counterweight system for a wind turbine comprising a hub mounted to a nacelle such that the hub is rotatable around a rotation axis with respect to the nacelle. The counterweight system comprises: a mechanical unit comprising a fixed part and a rotatable part, the fixed part being mountable to the hub in such a way that the rotatable part is rotatable with respect to the hub substantially around the rotation axis of the hub; a drive unit for causing rotation of the rotatable part; a beam coupled to the rotatable part at a first point of the beam in such a way that the beam is arranged substantially perpendicular to the rotation axis of the hub; and a counterweight mass coupled to the beam at a second point of the beam. A method of mounting a blade to a hub by using said counterweight system is also provided.

10 Claims, 4 Drawing Sheets

(51) Int. Cl.
*F03D 80/80* (2016.01)
*F03D 13/10* (2016.01)

(52) U.S. Cl.
CPC ..... *F05B 2230/60* (2013.01); *F05B 2230/608* (2013.01); *Y02E 10/72* (2013.01); *Y02P 70/523* (2015.11); *Y10T 29/49316* (2015.01); *Y10T 29/49321* (2015.01)

(58) Field of Classification Search
CPC ...... F03D 80/00; F03D 80/88; F05B 2230/60; F05B 2230/608; Y10T 29/49321; Y10T 29/49316; Y02E 10/728; Y02P 70/523
See application file for complete search history.

(56) References Cited

U.S. PATENT DOCUMENTS

| | | | | |
|---|---|---|---|---|
| 2012/0073134 | A1* | 3/2012 | Bywaters | H02K 7/1838 29/889.1 |
| 2013/0272876 | A1* | 10/2013 | Falkenberg | F03D 11/00 416/1 |

* cited by examiner

COUNTERWEIGHTING A WIND TURBINE HUB

This application claims priority to European Application No. 14382116.3 filed Mar. 28, 2014, the entire contents of which are hereby incorporated by reference in its entirety for all purposes.

The present disclosure relates to counterweight systems for a wind turbine hub, and to methods of mounting a blade to a wind turbine hub by using one of such counterweight systems.

BACKGROUND

Modern wind turbines are commonly used to supply electricity into the electrical grid. Wind turbines generally comprise a rotor with a rotor hub and a plurality of blades. The rotor is set into rotation under the influence of the wind on the blades. The rotation of a rotor shaft drives a generator rotor either directly ("directly driven") or through the use of a gearbox. The gearbox (if present), the generator and other systems are usually mounted in a nacelle on top of a wind turbine tower.

When wind turbines are erected, the tower is generally constructed first. Then the nacelle, which usually contains the generator and the gearbox (if present), is usually mounted on top of the tower. Then, the hub may be hoisted and mounted. Finally, the blades are hoisted one by one from a ground level towards the rotor hub and mounted therein. In an alternative method, one or more blades may be pre-assembled with the hub when lifting the hub.

The blades may be installed in a variety of ways, e.g. in a substantially vertical manner or substantially horizontally or at other inclined angles. Particularly, in offshore wind turbines, mounting a blade from above the hub may be very complicated, or at least require an enormous crane and jack-up barge. Such an installation method may thus be very expensive and depending on the depth of the sea may simply be impossible.

It is known to hoist a complete rotor assembly, i.e. the hub with blades, and mount it to e.g. the nacelle. But in order to mount a complete rotor assembly, a large surface area is required, which is typically not available in the case of offshore wind turbines.

It is further known to mount an incomplete rotor assembly on the nacelle, e.g. the hub with two blades and subsequently, mounting the remaining blade. In these cases, the rotor with the two blades is normally mounted with the two blades pointing upwards, i.e. "bunny ears" configuration. There is thus no need for rotating the wind turbine rotor as the third blade could be vertically mounted from below. However, in order to be able to perform these rather complicated installation steps, the prevailing wind speed has to be below a predetermined value, for example 6 or 8 m/s for a prolonged period of time. The period of time depends on the expected length of the installation operation and a safety factor to be taken into account.

During certain seasons, windows of several hours in which the wind does not reach the predetermined value of e.g. 6 m/s may not be available very often. In practice, this may mean that personnel and maintenance equipment, including e.g. expensive cranes and jack-up barges, may be in stand-by during days or even weeks. This may represent an enormous cost.

It is known to mount each of the plurality of blades substantially horizontally or substantially vertically. This means that individual installation steps may require less time and may be performed at higher winds, thus increasing the time windows available for installation. However, such methods require rotation of the hub between the mounting of one blade and another. In order to correctly position the hub, torque is required for rotating the wind turbine rotor after mounting one blade in order to mount the next one. When not all blades have been mounted onto the hub, the hub is not balanced, so that the weight of one or more blades has to be carried upwards when rotating the hub. Application of a very high torque may therefore be necessary for rotating the hub.

The torque may be delivered by using the gearbox (when present) with an external power supply for rotating the rotor. Such a system may be used in combination with a locking pin for maintaining the rotor in a desired position for installation. This is not possible in case of directly driven wind turbines as no gearbox is provided between rotor and generator. Even though the generator may be suitable for being operated as a motor, it will generally not be able to deliver the required torque to rotate the hub, especially when the hub is unbalanced, i.e. when at least one but not all the blades have been mounted.

It is an object of the present disclosure to provide systems and methods that at least partially reduce one or more of the aforementioned drawbacks leading to improved methods of installing wind turbine blades especially suitable for direct drive offshore wind turbines.

SUMMARY

The present disclosure provides a counterweight system for a wind turbine and a method of mounting a blade to a wind turbine by using such a counterweight system.

In a first aspect, a counterweight system is provided for a wind turbine which comprises a hub mounted to a nacelle such that the hub is rotatable around a rotation axis with respect to the nacelle. The counterweight system comprises a mechanical unit having a fixed part and a rotatable part. The fixed part is mountable to the hub in such a way that the rotatable part is rotatable with respect to the hub substantially around the rotation axis of the hub.

The counterweight system further comprises a drive unit for causing rotation of the rotatable part, and a beam coupled to the rotatable part at a first point of the beam. The beam is coupled to the rotatable part in such a way that, when the fixed part is mounted to the hub, the beam is arranged substantially perpendicular to the rotation axis of the hub. The counterweight system still further comprises a counterweight mass coupled to the beam at a second point of the beam at a distance from the first point of the beam.

This proposed system may be very suitable for positioning a wind turbine hub such that one or more blades may be mounted to it in predefined desired position(s), such as e.g. horizontally.

An aspect of this counterweight system may be that rotation of the hub may be caused by simply rotating the counterweight mass suitably. Rotation of the hub without any blade mounted to it may be caused by causing a pendulum motion of the counterweight mass. Rotation of the hub carrying some blade(s) may be induced by operating the counterweight system for suitably counterweighting the blade(s) carried by the hub. Details of examples of operation of the proposed counterweight system for inducing desired rotation(s) of the hub will be explained in other parts of the description.

Another aspect of this counterweight system may be that it may be operated to induce suitable weight(s) distribution(s) such that balanced situations of the hub may be obtained. These balanced weights distributions may be induced by rotating the counterweight mass in such a way that a suitable relative position between the counterweight mass and the installed blade(s) (and/or to be installed blade) is achieved.

A further aspect of the proposed counterweight system may be that in some examples no drive units (either internal or external) are required for causing a "direct" rotation of the hub, since this counterweight system may be operated based on taking maximum advantage of weight loads. These weight loads may have their origin in the weight of the counterweight mass and the weight of some blade(s) carried by the hub.

The proposed system may therefore permit causing desired rotation(s) of the hub, causing desired balanced position(s) of the hub, etc. without the need of a drive system aimed at directly rotating the hub. A drive unit is required for causing rotation of the counterweight beam-mass, but it may be much less powerful than a drive system for directly rotating the hub. Rotation of the counterweight beam-mass may require a significantly smaller torque in comparison with rotation of the hub, especially when carrying some blade(s).

In some examples, the counterweight system may further comprise a locking unit for locking the rotatable part, i.e. its rotation may be locked. Locking the rotatable part and so the counterweight beam-mass may permit ensuring that the counterweight mass remains stable in a certain desired position. This locking unit may comprise e.g. a locking pin.

In configurations of the counterweight system, the fixed part of the mechanical unit may be mountable to a front portion (i.e. a "nose") of the hub. In alternative implementations, the fixed part of the mechanical unit may be mountable to a region of the hub configured to receive a blade root. In particular, the fixed part of the mechanical unit may be mountable to a pitch bearing comprised in this region of the hub configured to receive a blade root.

An aspect of the counterweight system being mountable to the "nose" of the hub may be that no complex structures may be required for the fixed part of the mechanical unit. However, some part of the "nose" may require some kind of special arrangement for supporting the fixed part of the mechanical unit.

An aspect of the counterweight system being mountable to a region of the hub configured to receive a blade root may be that the hub may not require any special adaptation for supporting the fixed part of the mechanical unit. Instead of such an adaptation, an existing region of the hub (used to receive a blade root) may be re-used for mounting the counterweight system to the hub.

In some examples, the hub (of the wind turbine) may be configured to carry a plurality of blades each having a centre of mass, wherein the distance between the first and second points of the beam may be substantially equal to a distance between the centre of mass of a blade (when carried by the hub) and the rotation axis of the hub.

In some implementations, the hub may be configured to carry a plurality of blades each having a mass. Taking this assumption into account, the counterweight mass may be substantially equal to the mass of a blade.

One or more of the two previous features may permit e.g. achieving balanced situations of the hub (including the counterweight mass) more easily by simply inducing substantially symmetric positions of the counterweight mass and blade(s) carried by the hub. This aspect may however be limited to particular blade(s) configuration(s).

According to some configurations, the beam may be a telescopic beam such that the distance between the first and second points of the beam can be varied. This feature may permit adapting the counterweight system to heterogeneous wind turbine configurations. For example, suitably adjusting the distance between the mass and the corresponding axis of rotation may permit using the system for mounting different types of blades to different types of hubs (and so different types of wind turbines).

In some examples, the counterweight system may be mounted to a direct drive wind turbine. The proposed counterweight system may be especially suitable for directly driven wind turbines as no gearbox is provided between rotor and generator in this particular type of wind turbines.

Furthermore, a wind turbine may be provided comprising a hub and anyone of the previously described counterweight systems mounted to the hub.

In a second aspect, a method is provided for mounting a blade to a hub of a wind turbine by using any of the above described counterweight systems. In this method, the wind turbine is assumed to have a nacelle with a hub mounted to the nacelle in such a manner that the hub is rotatable around a rotation axis with respect to the nacelle. Besides, the counterweight system is assumed to be mounted to the hub.

This method (of mounting a blade) comprises operating the drive unit of the counterweight system for causing rotation of the hub to a desired position for mounting the blade to the hub. In a further step, the method comprises mounting the blade to the hub.

The proposed method of mounting a (single) blade to the hub may be based on some of the principles commented on with respect to the counterweight systems described before. The counterweight system can be operated for counterweighting the hub such that a desired position of the hub is achieved for mounting a blade. When the hub is still not carrying any blade, a pendulum motion of the counterweight beam-mass may be caused for inducing the hub to rotate to the desired position. When the hub is carrying some blade(s), the desired position of the hub may be achieved by inducing suitable weights distributions (of the counterweight beam-mass and blades) and corresponding motions caused by said distributions.

In some examples, rotation of the hub may be further caused by operating a generator of the wind turbine as a motor, depending on the circumstances. In this case, a relatively small torque provided by the generator/motor may be enough for advantageously assisting the counterweight system to induce the hub to suitably rotate.

Additionally or alternatively to operating a generator as a motor, in some examples, one or more auxiliary gear motors (or gearbox-motor units) may be used for assisting the drive unit of the counterweight system in causing rotation of the hub.

In some configurations, the wind turbine may further comprise a locking system for locking (rotation of) the hub. Such a locking system may comprise one or more pins on the nacelle that can be introduced into corresponding holes in the rotor or generator. With such a locking system, the method may further comprise locking the hub once a desired position of the hub has been achieved. Additionally or alternatively, some additional system(s) (e.g. wind turbine generator operated as a motor, auxiliary gear motor(s), etc.) may be operated for retaining the hub in a certain position.

In some examples, the method may further comprise operating the drive unit of the counterweight system to cause rotation of the counterweight mass to a position for at least partially compensating a variation of torque on the hub due to weight loads resulting from mounting the blade to the hub. In other words, the counterweight system can be operated to cause the hub (including the counterweight beam-mass) to achieve a balanced position taking into account a weight load due to the (future or past) mounting of the blade to the hub. This weight load may induce a corresponding torque on the hub.

In some examples, this torque on the hub may be anticipated before installation of the blade, and so it may be compensated in advance (before installation of the blade). In this case, the balanced position of the hub will occur upon installation of the blade. Alternatively, operating the counterweight system for causing the hub to achieve the balanced position may be performed once the blade has been mounted to the hub.

A balanced situation of the hub may be a non-fully balanced situation, since the weight of the counterweight mass and of the blade(s) (mounted or to be mounted to the hub) may create together a resultant torque on the hub that can be different from zero. The magnitude of said resultant torque may however be relatively small, so that the drive unit of the counterweight system may only be required to generate a corresponding small torque to compensate the resultant torque due to weight loads. In any case, the required torque may be lower than in the absence of such a counterweight system.

The above mentioned operation of a generator (of the wind turbine) as a motor may also be used for compensating at least in part said resultant torque in a non-fully balanced situation. Additionally or alternatively, the above mentioned operation of (auxiliary) gear motors may also be used for compensating at least in part said resultant torque in a non-fully balanced situation.

The abovementioned (fully or non-fully) balanced position of the hub (caused in advance or not) may permit performing a next iteration of the method for mounting a next blade to the hub without requiring the drive unit of the counterweight system to apply a high torque, since said next iteration starts from a balanced situation of the hub. Several iterations (as many as blades to be mounted) may thus be performed in the form of transitions from a first balanced situation of the hub to a second balanced situation of the hub.

One or more of said next iterations may further comprise operating the locking unit of the wind turbine for unlocking the hub if it has been locked in the preceding iteration.

In some implementations, the method may further comprise operating a locking unit (if present in the counterweight system used) for causing locking of the rotatable part (and so of the beam-mass) of the counterweight system. This locking of the counterweight system may be caused once a desired position of the counterweight beam-mass has been achieved. This may ensure that the beam-mass will remain in said desired position and relief the drive unit.

In examples of the method, the desired position of the hub is a position in which the blade can be mounted horizontally. This may be especially advantageous for mounting blade(s) to offshore wind turbines, where working/space conditions may be very limited.

A method may be provided for mounting a plurality of blades to a hub of a wind turbine by using anyone of the previously described counterweight systems. In this method, the counterweight system is assumed to be mounted to the hub. This method of mounting a plurality of blades may comprise repeating any of the previously described methods of mounting a (single) blade, for another blade or for all blades.

In the context of this method of mounting a plurality of blades, the plurality of blades may be assumed comprising a last blade to be mounted to the hub ultimately. Taking this into consideration, the method (of mounting a plurality of blades) may further comprise dismounting the counterweight system from the hub before mounting the last blade to the hub.

BRIEF DESCRIPTION OF THE DRAWINGS

Non-limiting examples of the present disclosure will be described in the following, with reference to the appended drawings, in which.

DETAILED DESCRIPTION OF EXAMPLES

Figure 1B:
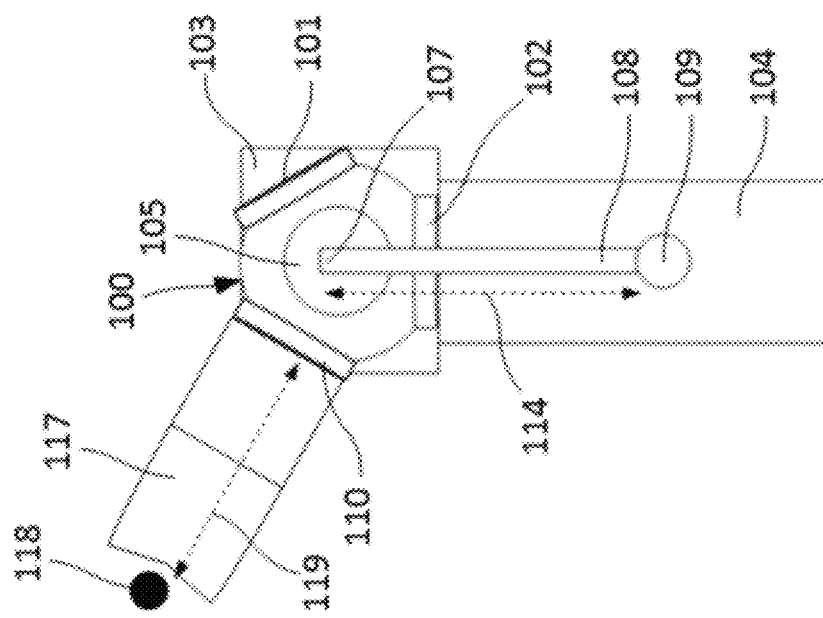
FIGS. 1a-1b schematically represents a side view and a front view of a counterweight system according to an example, said counterweight system being mounted to a hub of a wind turbine.
Figure 1A:
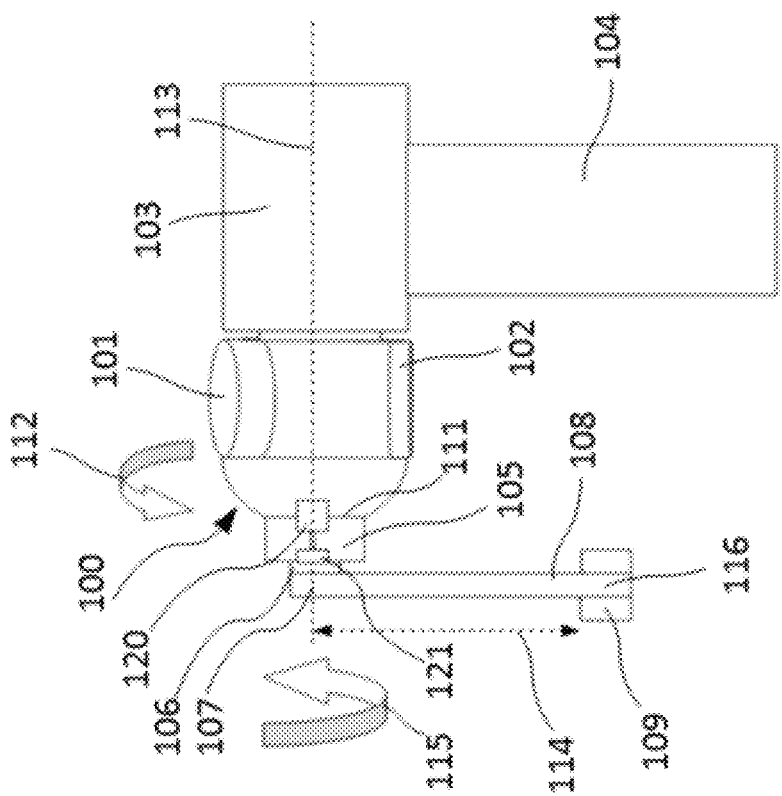

FIGS. 1a-1b schematically represents a side view and a front view of a counterweight system according to an example, said counterweight system being mounted to a hub 100 of a wind turbine. FIG. 1a shows said side view, and FIG. 1b shows said front view.

In both FIGS. 1a and 1b, the wind turbine is shown having a tower 104, a nacelle 103 mounted on the tower 104, and a hub 100 mounted to the nacelle 103. The hub 100 is mounted to the nacelle 103 in such a way that the hub 100 is rotatable 112 around a rotation axis 113 (not indicated in FIG. 1b) with respect to the nacelle 103. The hub 100 is shown comprising a first region 101 adapted to receive a blade root, a second region 102 adapted to receive a blade root, and a third region 110 adapted to receive a blade root. This third region 110 is shown in FIG. 1b but not in FIG. 1a.

The counterweight system is shown comprising a mechanical unit comprising a fixed part 105 and a rotatable part 106 (not shown in FIG. 1b). The fixed part 105 may be mountable to the hub 100 in such a way that the rotatable part 106 is rotatable 115 with respect to the hub 100 substantially around the rotation axis of the hub 113.

In some implementations, this fixed part 105 may be mountable to a front portion of the hub 100. Alternatively, this fixed part 105 may be mountable to a region of the hub 100 configured to receive a blade root. For example, this fixed part 105 may be mountable to a pitch bearing comprised in said region of the hub 100 configured to receive a blade root (such as e.g. any of the regions 101, 102, 110).

Details about how the fixed part 105 can be mountable to a hub region 101, 102, 110 adapted to receive a blade root will be discussed in other parts of the description with reference to FIG. 2.

In the particular views of FIGS. 1a and 1b, the fixed part 105 is mounted to a front portion (e.g. a "nose") 111 of the hub 100. This front portion 111 is not shown in FIG. 1b. The counterweight system of FIGS. 1a and 1b is shown having a beam 108 coupled to the rotatable part 106 at a first point 107 of the beam 108 in such a way (when the fixed part 105 is mounted to the hub 100) that the beam 108 is arranged substantially perpendicular to the rotation axis of the hub 113.

The counterweight system of FIGS. 1a and 1b is shown as further comprising a counterweight mass 109 coupled to the beam 108 at a second point 116 of the beam 108 at a distance 114 from the first point 107 of the beam 108. The counterweight system may further comprise a drive unit 120 (FIG. 1a) for causing rotation of the rotatable part 106 of the mechanical unit.

The hub 100 may be configured to carry a plurality of blades. Only one blade 117 and its center of mass 118 are shown in FIG. 1b. In some examples, the distance 114 between the first and second points 107, 116 of the beam 108 may be e.g. substantially equal to a distance 119 between the center of mass 118 of a blade 117 when carried by the hub 100 and the rotation axis of the hub 113.

Each of the blades 117 carried by the hub 100 have a corresponding center of mass 118. In some examples of the counterweight system, the counterweight mass 109 may be substantially equal to said mass of the blade 117.

According to examples of the counterweight system, the beam 108 may be a telescopic beam such that the distance 114 between the first and second points 107, 116 of the beam 108 can be suitably varied.

Figure 2:
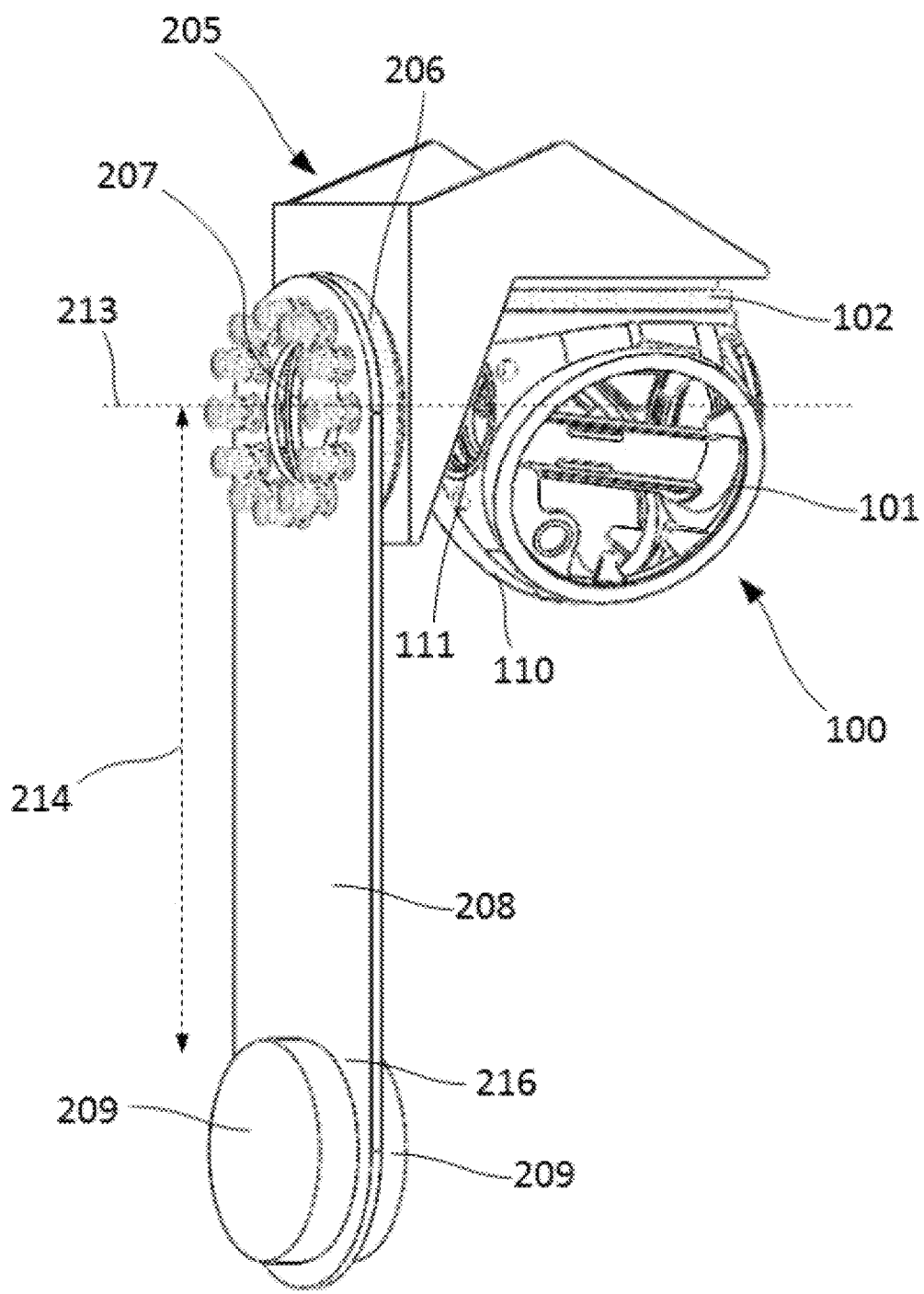
FIG. 2 is a schematic representation of another counterweight system according to an alternative example, said counterweight system being mounted to a hub of a wind turbine.

FIG. 2 is a schematic representation of another counterweight system according to an alternative example, said counterweight system being mounted to a hub 100 of a wind turbine. The hub 100 shown in FIG. 2 may be similar to the one shown in FIGS. 1a and 1b. The same reference numbers used in FIGS. 1a and 1b have been re-used in FIG. 2 to indicate the same or similar elements of the hub 100.

In FIG. 2, the counterweight system is also shown to be mounted to the hub 100. In this case, however, the counterweight system is shown comprising a fixed part 205 (of a corresponding mechanical unit) configured to be coupled to a corresponding region 102 of the hub 100 adapted to receive a blade root. In this particular figure, the fixed part 205 is shown coupled to the region 102 of the hub 100, but it could be similarly coupled to the region 101 or to the region 110.

A rotatable part 206 (of the mechanical unit) is shown coupled to the fixed part 205 such that, when the fixed part 205 is coupled to a region of the hub 100 adapted to receive a blade root (such as anyone of the regions 102 or 101 or 110), the rotatable part 206 is arranged just in front of a front region ("nose") 111 of the hub 100. In particular, the rotatable part 206 is shown in FIG. 2 to be arranged in the vicinity of the "nose" 111 of the hub 100 in such a way that the rotatable part 206 can be rotated (driven by a corresponding drive unit 120 (FIG. 1a)) with respect to the hub 100 substantially around the rotation axis 213 of the hub 100.

The counterweight system of FIG. 2 is also shown having a beam 208 coupled to the rotatable part 206 at a first point 207 of the beam 208 in such a way that, when the fixed part 205 is mounted to the hub 100, the beam 208 is arranged substantially perpendicular to the rotation axis 213 of the hub 100. Furthermore, a counterweight mass 209 is shown coupled to the beam 208 at a second point 216 of the beam 208 at a distance 214 from the first point 207 of the beam 208.

Other aspects and/or features commented with respect to the counterweight system of FIGS. 1a and 1b may be similarly attributed to the counterweight system of FIG. 2. For example, the beam 208 may be a telescopic beam so that the first and second points 207, 216 of the beam 208 can be selectively distanced by substantially the same amount as a blade center of mass is distanced from the hub root.

An aspect of the counterweight system of FIG. 2 with respect to the counterweight system of FIGS. 1a and 1b is that no special arrangements may be required in the hub 100 for mounting the counterweight system to the hub 100. The counterweight system of FIG. 2 is configured to be mounted to a region 102 (or 101 or 110) which is necessary for the hub 100 to carry a blade which, in turn, is necessary for the wind turbine to operate. That is, a region 102 (or 101 or 110) which is necessary for the wind turbine to operate may be re-used for mounting the counterweight system to the hub 100.

Otherwise, the counterweight system of FIGS. 1a and 1b may require the "nose" 111 of the hub 100 to have some kind of special arrangement (although it may be simple) for the counterweight system to be coupled to the "nose" 111.

FIGS. 3a-3m schematically illustrate a sequence of situations occurring during performance of a method of mounting a plurality of blades to a hub of a wind turbine, according to an example. Said method will be described below with reference to said sequence of situations illustrated by FIGS. 3a-3m. For the sake of simplicity, references to FIGS. 1a and 1b may be made along said descriptions.

Also for the sake of simplicity, references to times indicated by an "imaginary" clock may also be included in descriptions about FIGS. 3a-3m. Said references to times may be used to indicate approximate positions of a blade and/or a counterweight beam-mass (of a counterweight system according to an example) by considering said blade and/or counterweight beam-mass as an hour hand of said "imaginary" clock. Thus, for example, reference may be made to the counterweight beam-mass pointing to 6 o'clock to indicate that the counterweight beam-mass is vertically pointing downwards.

The method of mounting a plurality of blades 300-302 implicitly illustrated by FIGS. 3a-3m may comprise several iterations of a method of mounting a single blade to the hub 100. In particular, FIGS. 3a-3e illustrate a first sequence of situations caused by a first iteration aimed at mounting a first blade 300 to the hub 100. FIGS. 3f-3i illustrate a second sequence of situations caused by a second iteration aimed at mounting a second blade 301. FIGS. 3j-3m illustrate a third sequence of situations caused by a third iteration aimed at mounting a third blade 302.

Figure 3A:
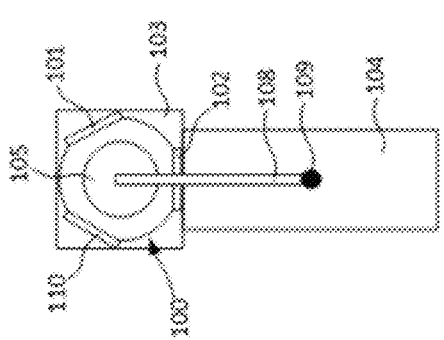
FIGS. 3a-3m schematically illustrate a sequence of situations occurred during performance of a method of mounting a plurality of blades to a hub of a wind turbine, according to an example.

FIG. 3a illustrates an initial situation in which the counterweight beam-mass 108-109 is pointing to 6 o'clock (i.e. freely hanging) and the hub 100 is not in a desired position for mounting the first blade 300. This initial position corresponds to a balanced position of the hub 100.

Figure 3B:
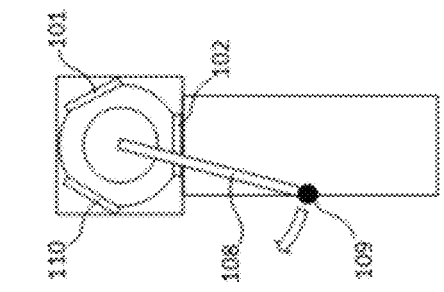
Figure 3C:
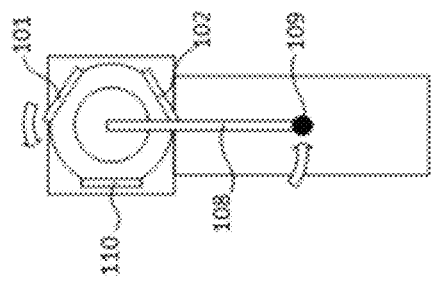

FIG. 3b illustrates the counterweight beam-mass 108-109 rotated (by properly operating a corresponding drive unit 120 (FIG. 1a) of the counterweight system) in a clockwise direction for leading the counterweight beam-mass 108-109 towards a "7 o'clock" position or the like. FIG. 3c implicitly illustrates that the weight of the counterweight beam-mass 108-109 acts (in anti-clockwise direction) against said "forced" motion in clockwise direction, such that a pendulum movement (back to the 6 o'clock position) is performed by the counterweight beam-mass 108-109.

This pendulum motion of the counterweight beam-mass 108-109 induces an imbalance/torque (due to only weight loads) in the hub 100, which causes the hub 100 to rotate. This rotation of the hub 100 is counterclockwise (as reflected in FIG. 3c) such that the hub 100 is moved to a desired position for mounting a first blade 300.

Once the hub 100 is in the desired position for mounting the first blade 300 (e.g. horizontally), the hub 100 may be locked by a corresponding locking unit 121 (FIG. 1a) (if present in the wind turbine). This locking of the hub 100 ensures that the hub 100 remains in the desired position during the entire mounting operation of the blade 300.

Figure 3D:
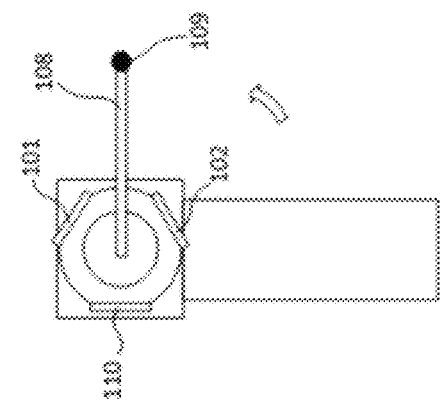

FIG. 3d illustrates the counterweight beam-mass 108-109 rotated (by the drive unit 120 (FIG. 1a)) to e.g. a 3 o'clock position, which creates an anticipated counter-torque on the hub 100. This anticipated counter-torque may be of an amount substantially equal to a torque that will be induced by the weight of the first blade 300 once completely mounted to the hub. Once the counterweight beam-mass 108-109 is in the 3 o'clock position (or any other position aimed at achieving the mentioned objective), it may be locked by a corresponding locking unit 121 (FIG. 1a) (if present in the counterweight system).

Figure 3G:
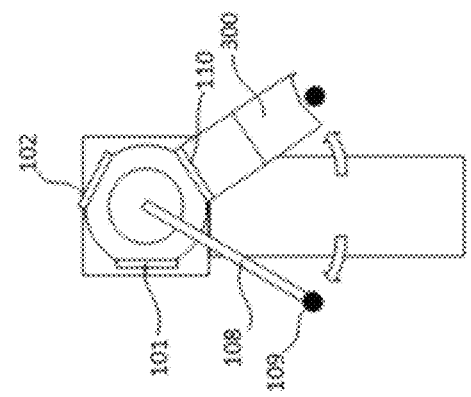
Figure 3F:
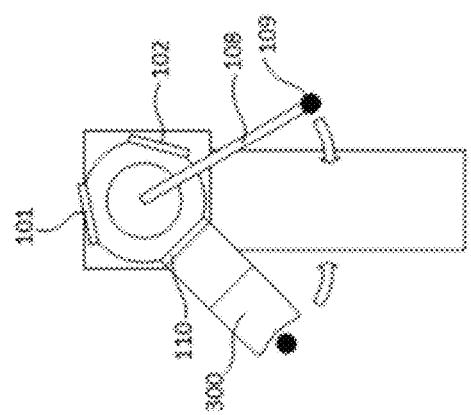
Figure 3E:
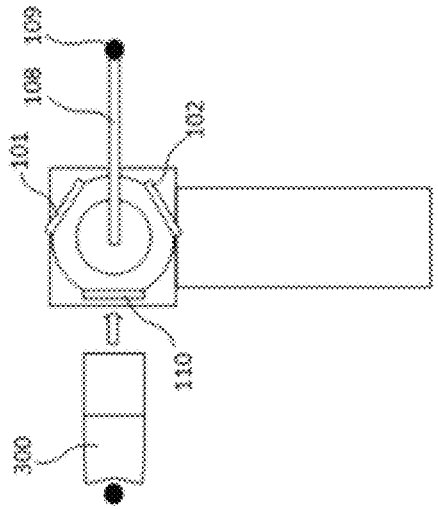

FIG. 3e illustrates the first blade 300 mounted to a suitable region 110 of the hub 100. The blade 300 may be mounted horizontally to the hub 100 (as shown in FIG. 3e) but other (non-horizontal) orientations may be considered depending on e.g. the particular configuration of the wind turbine. Once the blade 300 has been mounted to the region 110, the hub 100 may become significantly balanced. The weight of the blade 300 (in 9 o'clock position) and the weight of the counterweight beam-mass 108-109 (in 3 o'clock position) induce respective torques on the hub which may substantially cancel each other out. Accordingly, since a resultant torque of zero or close to zero may result, the hub 100 becomes substantially balanced.

Once the first blade 300 has been mounted to the region 110, the hub 100 is in a balanced position. Then, a next iteration of the method of installing a single blade may be started from said balanced position of the hub 100. FIG. 3f illustrates said starting of said new iteration. Prior to the operation illustrated by FIG. 3f, the hub 100 may be unlocked (by suitably operating the corresponding locking unit 121 (FIG. 1a)) for cancelling the locking of the hub 100 occurred in the previous iteration.

FIG. 3f illustrates the counterweight beam-mass 108-109 rotated in a clockwise direction from the 3 o'clock position (of FIG. 3e). This clockwise rotation of the counterweight beam-mass 108-109 may cause the (unlocked) hub 100 to rotate, due to the weight of the blade 300, counterclockwise from the 9 o'clock position (of FIG. 3e).

FIG. 3g illustrates the rotation of the counterweight beam-mass 108-109 commented with reference to FIG. 3f stopped when the hub 100 has achieved a desired position for mounting a second blade 301 to the hub. In the particular case of FIG. 3g, said rotation is stopped when an available region 101 suitable for receiving a blade root is pointing to 9 o'clock, such that the second blade 302 may be mounted to said region 101 horizontally. The hub 100 is again in a balanced position due to a "symmetric" distribution of the first blade 300 (in e.g. 5 o'clock position) and the counterweight beam-mass 108-109 (in e.g. 7 o'clock position).

In the situation illustrated by FIG. 3g, the hub 100 may be locked by a corresponding locking unit 121 (FIG. 1a) (if present in the wind turbine). This locking of the hub 100 may ensure that the hub 100 will remain in the desired position for mounting the second blade 301.

Figure 3J:
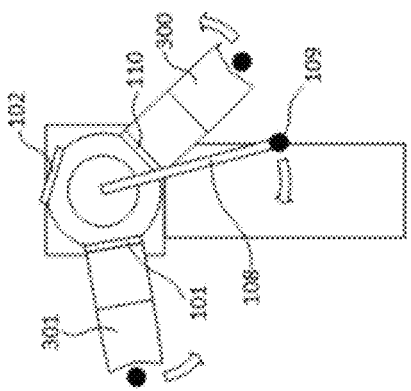
Figure 3M:
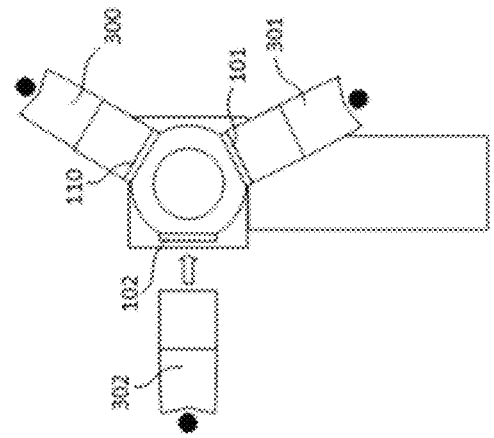
Figure 3I:
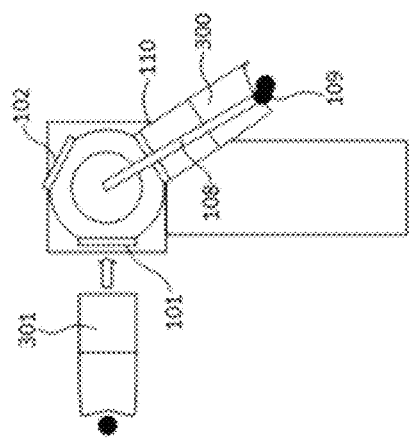
Figure 3L:
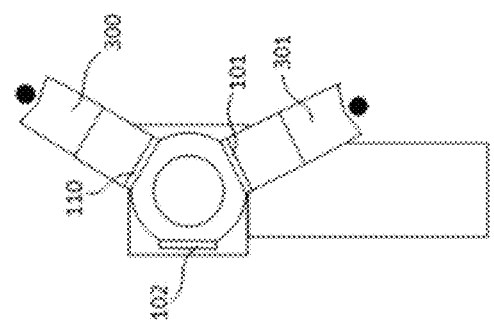
Figure 3H:
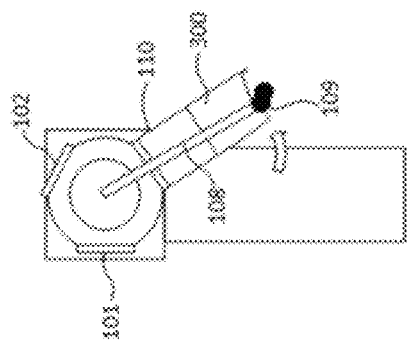

FIG. 3h illustrates the counterweight beam-mass 108-109 rotated counterclockwise from a position (e.g. 5 o'clock position) which may cause the hub 100 to be again in an anticipated balanced situation taking into account the future installation of the second blade 301. Once the counterweight beam-mass 108-109 is in the e.g. 5 o'clock position, it may be locked by a corresponding locking unit 121 (FIG. 1a) (if present in the counterweight system).

FIG. 3i illustrates the second blade 301 being (horizontally) mounted to the corresponding region 101 of the hub 100. Once mounted, a torque induced on the hub 100 by the weight of the second blade 301 may be suitably cancelled by a torque induced on the hub 100 by the weight of the first blade 300 and the counterweight beam-mass 108-109. Accordingly, the hub 100 is now again in a balanced situation caused by a resultant torque equal or close to zero. Then, a next iteration of the method of installing a single blade may be started from said balanced position of the hub 100. FIG. 3j illustrates said starting of said new iteration.

Prior to the operation illustrated by FIG. 3j, the hub 100 may be unlocked (by suitably operating the corresponding locking unit 121 (FIG. 1a)) for cancelling the locking of the hub 100 occurred in the previous iteration.

Figure 3K:
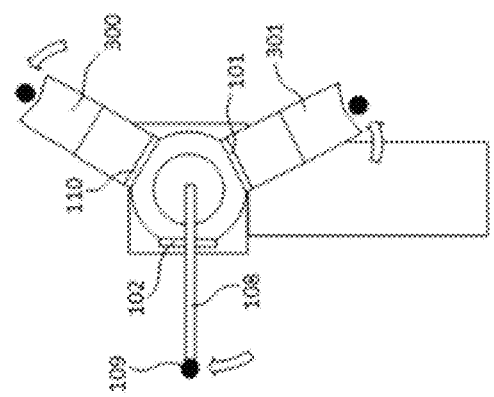

FIG. 3j illustrates the counterweight beam-mass 108-109 rotated in a clockwise direction (from the e.g. 5 o'clock position) which causes the hub 100 to rotate in a counter-clockwise direction. FIG. 3k illustrates that said rotation of the counterweight beam-mass 108-109 may be stopped once it has induced the hub 100 to rotate to a position suitable for mounting the third blade 302 to the hub 100. Then, the hub 100 may be locked by a corresponding locking unit 121 (FIG. 1a) (comprised in the wind turbine) in order to ensure that the hub 100 will remain in the desired position during the entire mounting of the third blade 302.

In the particular example of FIG. 3k, the counterweight beam-mass 108-109 is shown pointing to around 9 o'clock position, the first blade 300 is shown pointing to around 1 o'clock position, and the second blade 301 is shown pointing to around 5 o'clock position. The hub 100 is now again in a balanced position.

FIG. 3l illustrates the counterweight system (i.e. the counterweight beam-mass 108-109) dismounted from the hub 100. The hub 100 is now in an anticipated balanced situation taking into account the future installation of the third blade 302.

FIG. 3m illustrates that the third blade 302 may be (horizontally) mounted to a suitable region 102 of the hub 100. Once mounted, this third blade 302 causes the hub 100 to be in a balanced situation in conjunction with the other previously installed blades 300, 301.

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the claims that follow.

What is claimed is:

1. A counterweight system for a wind turbine comprising a hub mounted to a nacelle such that the hub is rotatable around a rotation axis with respect to the nacelle, the counterweight system comprising:
   a mechanical unit comprising a fixed part and a rotatable part coupled to the fixed part, the fixed part being mountable to the hub in such a way that the rotatable part is rotatable with respect to the hub substantially around the rotation axis of the hub;
   a drive unit for causing rotation of the rotatable part;
   a beam coupled to the rotatable part at a first point of the beam in such a way that, when the fixed part is mounted to the hub, the beam is arranged substantially perpendicular to the rotation axis of the hub;

a counterweight mass coupled to the beam at a second point of the beam at a distance from the first point of the beam; and wherein the fixed part is mountable to a region of the hub configured to receive a blade root.

2. The counterweight system according to claim 1, wherein the fixed part is mountable to a pitch bearing in the region of the hub configured to receive a blade root.

3. The counterweight system according to claim 2, wherein the beam is a telescopic beam such that the distance between the first and second points of the beam can be varied.

4. The counterweight system according to claim 1, further comprising a locking unit for locking the rotatable part.

5. The counterweight system according to claim 1, wherein the hub is configured to carry a plurality of blades each having a center of mass; and wherein a distance between the first and second points of the beam is substantially equal to a distance between the center of mass of a blade of the plurality of blades when carried by the hub and the rotation axis of the hub.

6. The counterweight system according to claim 1, wherein the hub is configured to carry a plurality of blades each having a mass; and wherein the counterweight mass is substantially equal to a mass of a blade of the plurality of blades.

7. The counterweight system according to claim 1, wherein the beam is a telescopic beam such that the distance between the first and second points of the beam can be varied.

8. The counterweight system according to claim 1, wherein the wind turbine is a direct drive wind turbine.

9. A wind turbine comprising a hub and a counterweight system according to claim 1 mounted to the hub.

10. The counterweight system according to claim 1, wherein the beam is a telescopic beam such that the distance between the first and second points of the beam can be varied.

* * * * *